US012345211B2

(12) United States Patent
Kalyanasamy et al.

(10) Patent No.: US 12,345,211 B2
(45) Date of Patent: Jul. 1, 2025

(54) UNCOMMANDED OR UNCONTROLLABLE HIGH THRUST DETECTION AND MITIGATION

(71) Applicants: Rolls-Royce North American Technologies Inc., Indianapolis, IN (US); Rolls-Royce Corporation, Indianapolis, IN (US)

(72) Inventors: Govindaraj Kalyanasamy, Indianapolis, IN (US); Mihir Desai, Yorba Linda, CA (US); Andrew Lee, Indianapolis, IN (US); Mark Collett, Derby (GB)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/453,069

(22) Filed: Aug. 21, 2023

(65) Prior Publication Data

US 2025/0067223 A1    Feb. 27, 2025

(51) Int. Cl.
*F02C 9/26* (2006.01)
*F02C 9/28* (2006.01)
*F02C 7/22* (2006.01)

(52) U.S. Cl.
CPC ............... *F02C 9/263* (2013.01); *F02C 9/28* (2013.01); *F02C 7/22* (2013.01)

(58) Field of Classification Search
CPC .... F02C 9/263; F02C 9/28; F02C 9/32; F02C 9/36; F02C 9/38; F02C 9/46
See application file for complete search history.

(56) References Cited

U.S. PATENT DOCUMENTS

| 2,670,598 A | 3/1954 | Van Millingen |
| 3,444,875 A | 5/1969 | Furlong et al. |

(Continued)

FOREIGN PATENT DOCUMENTS

| EP | 1 138 933 A2 | 10/2001 |
| EP | 1 380 796 A2 | 1/2004 |

(Continued)

OTHER PUBLICATIONS

U.S. Appl. No. 18/453,017, filed Aug. 21, 2023, naming inventors Andrew C. Lee et al.

(Continued)

*Primary Examiner* — Andrew H Nguyen
(74) *Attorney, Agent, or Firm* — Shumaker & Sieffert, P.A.

(57) ABSTRACT

A method of mitigating uncommanded or uncontrollable high thrust in a gas turbine engine is provided. The method may comprise pumping fuel to a combustor from a fuel tank, controlling a flow rate of the fuel to the combustor with a metering valve, spilling a portion of the fuel pumped by the pump with a primary spill valve, controlling a pressure of the fuel flowing to the combustor via a pressure valve, detecting a pressure differential across the pressure valve with a pressure transducer, determining the flow rate of the fuel based on the detected pressure differential and the positional feedback of the pressure valve opening, comparing the determined flow rate with a demand flow rate, and opening a secondary spill valve when the determined flow rate exceeds the demand flow rate.

19 Claims, 3 Drawing Sheets

(56) References Cited

U.S. PATENT DOCUMENTS

| | | |
|---|---|---|
| 3,808,801 A | 5/1974 | Taylor |
| 4,987,737 A | 1/1991 | Cantwell |
| 5,012,840 A | 5/1991 | Betzler |
| 5,111,653 A | 5/1992 | Leeson |
| 5,563,351 A | 10/1996 | Miller |
| 5,817,950 A | 10/1998 | Wiklund et al. |
| 6,176,076 B1 | 1/2001 | Ford |
| 6,684,163 B2 | 1/2004 | Antoine et al. |
| 7,204,076 B2 | 4/2007 | Griffiths et al. |
| 7,481,102 B2 | 1/2009 | Bickley |
| 7,845,177 B2 | 12/2010 | Parsons |
| 8,528,420 B2 | 9/2013 | Benson et al. |
| 8,601,822 B2 | 12/2013 | Paradise |
| 8,839,769 B2 | 9/2014 | Sasai et al. |
| 8,919,094 B2 | 12/2014 | Haugsjaahabink |
| 8,991,186 B2 | 3/2015 | Bickley et al. |
| 9,309,882 B2 | 4/2016 | Potel et al. |
| 9,435,267 B2 | 9/2016 | Myer et al. |
| 9,546,628 B2 | 1/2017 | Sanborn et al. |
| 9,771,906 B2 | 9/2017 | Henson |
| 9,790,864 B2 | 10/2017 | Skertic et al. |
| 10,125,732 B1 * | 11/2018 | Nyzen ................ F02M 37/0052 |
| 10,428,744 B2 | 10/2019 | Veilleux |
| 10,443,512 B2 | 10/2019 | Syed et al. |
| 11,513,033 B2 | 11/2022 | Lee |
| 2001/0052338 A1 | 12/2001 | Yates |
| 2005/0111988 A1 | 5/2005 | Griffiths |
| 2007/0107435 A1 | 5/2007 | Bickley |
| 2010/0115959 A1 | 5/2010 | Anson et al. |
| 2010/0305880 A1 | 12/2010 | Oddie |
| 2011/0146823 A1 | 6/2011 | Griffiths et al. |
| 2012/0042657 A1 * | 2/2012 | Hodinot .................. F02C 7/232 60/734 |
| 2012/0210716 A1 | 8/2012 | Weir et al. |
| 2012/0219429 A1 | 8/2012 | Heitz |
| 2012/0227707 A1 | 9/2012 | Sasai et al. |
| 2013/0036738 A1 | 2/2013 | Pora |
| 2014/0373611 A1 | 12/2014 | Potel et al. |
| 2015/0027412 A1 | 1/2015 | Henson |
| 2015/0125313 A1 | 5/2015 | Nyzen et al. |
| 2017/0227424 A1 | 8/2017 | Martucci et al. |
| 2018/0030898 A1 | 2/2018 | Emmons et al. |
| 2018/0163966 A1 | 6/2018 | Jones et al. |
| 2018/0320599 A1 | 11/2018 | Krynski et al. |
| 2020/0116084 A1 | 4/2020 | Pye |
| 2020/0271547 A1 | 8/2020 | Lee |
| 2024/0026825 A1 | 1/2024 | Susca et al. |

FOREIGN PATENT DOCUMENTS

| | | |
|---|---|---|
| EP | 2837799 B1 | 3/2016 |
| EP | 3640453 A1 | 4/2020 |
| GB | 2563660 A | 12/2015 |
| JP | H 11108712 A | 4/1999 |

OTHER PUBLICATIONS

Search Report from counterpart British Application No. GB2410914.2 dated Jan. 24, 2025, 3 pp.

* cited by examiner

UNCOMMANDED OR UNCONTROLLABLE HIGH THRUST DETECTION AND MITIGATION

TECHNICAL FIELD

This disclosure relates to gas turbine engines and, in particular, to controlling an output of thrust from a gas turbine engine.

BACKGROUND

Present thrust management systems, such as fuel pump and metering systems, suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
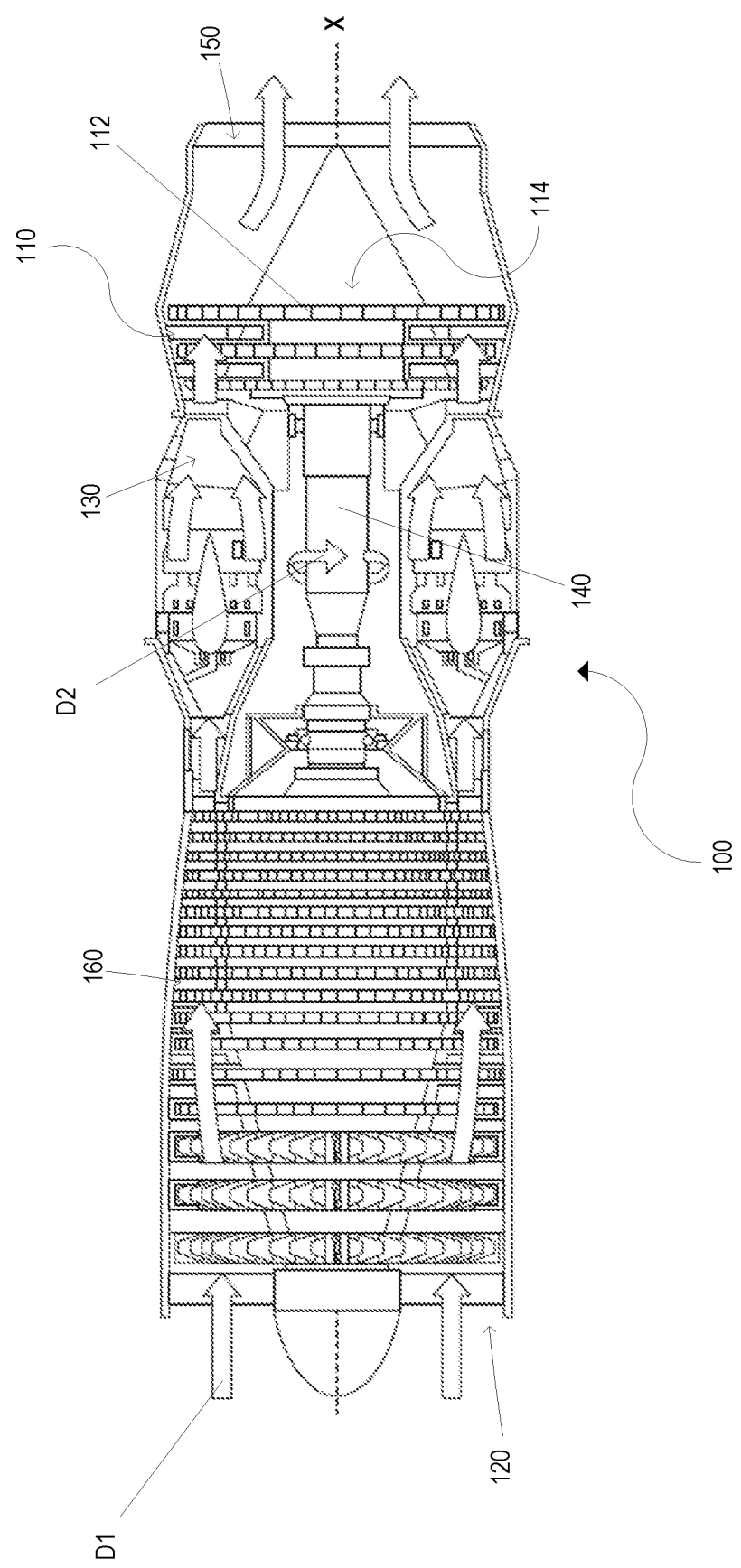
FIG. 1 illustrates a cross-sectional view of an example of a gas turbine engine.

A method of mitigating uncommanded or uncontrollable high thrust in a gas turbine engine may comprise spilling a portion of fuel with a primary spill valve. The primary spill valve may be disposed downstream from a pump. The method may comprise detecting a pressure differential across a pressure valve with a pressure transducer. The pressure valve may control a pressure of the fuel. The method may comprise determining a flow rate of the fuel based on the detected pressure differential and the positional feedback of pressure valve opening. The method may comprise opening a secondary spill valve in response to the determined flow rate exceeding a demand flow rate.

The method may comprise receiving an engine thrust command and generating a demand flow rate corresponding to the engine thrust command. The method may comprise controlling, with a metering valve, a flow of fuel sent to a combustor via the metering valve. The method may comprise controlling a pressure of the fuel sent to the combustor via the pressure valve. The pressure valve may be disposed downstream of the metering valve and upstream of the combustor. The method may comprise comparing the determined flow rate with the demand flow rate and a feedback of the pressure valve opening using an inductive probe. The method may comprise opening a spill valve when the determined flow rate exceeds the demand flow rate.

A system for mitigating uncommanded or uncontrollable high thrust in a gas turbine engine may comprise a fuel tank and a combustor in fluid communication with the fuel tank. The system may comprise a pump disposed downstream of the fuel tank and upstream of the combustor. The system may comprise a metering valve disposed downstream of the pump and upstream of the combustor. The system may comprise a pressure valve disposed downstream of the metering valve and upstream of the combustor. The system may comprise a pressure transducer configured to monitor the pressure differential across the pressure valve. The system may comprise a spill valve disposed downstream of the pump configured to spill additional flow when a flow rate determined based on the monitored pressure differential exceeds a demand flow rate.

One interesting feature of the systems and methods described below may be that an onset of an uncontrolled or uncommanded high thrust scenario may be detected before the impact is manifest on engine speed and thrust which are slower to respond due to engine inertia. This allows timely mitigation through the secondary spill valve. In the system and methods described herein, by using a pressure sensor and the feedback from dual channel inductive probe to determine the current flow of the fluid being provided to the burners, a discrepancy in the flow rate compared to the expected flow rate can be determined before an increase in thrust or horsepower happens, or before other systems would detect a resulting increase in thrust or horsepower after the uncontrolled or uncommanded high thrust scenario already happened.

Additionally or alternatively, the use of the secondary spill valve and pressure sensor, or pressure transducer along with the feedback from dual channel inductive probe, can lead to a more reliable system. The system and method describe herein can help mitigate an excess flow of fuel that may result from an error or failure in the system, for example, a failure in the metering valve, main spill valve, or some other component of the FPMU.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Figure 2:
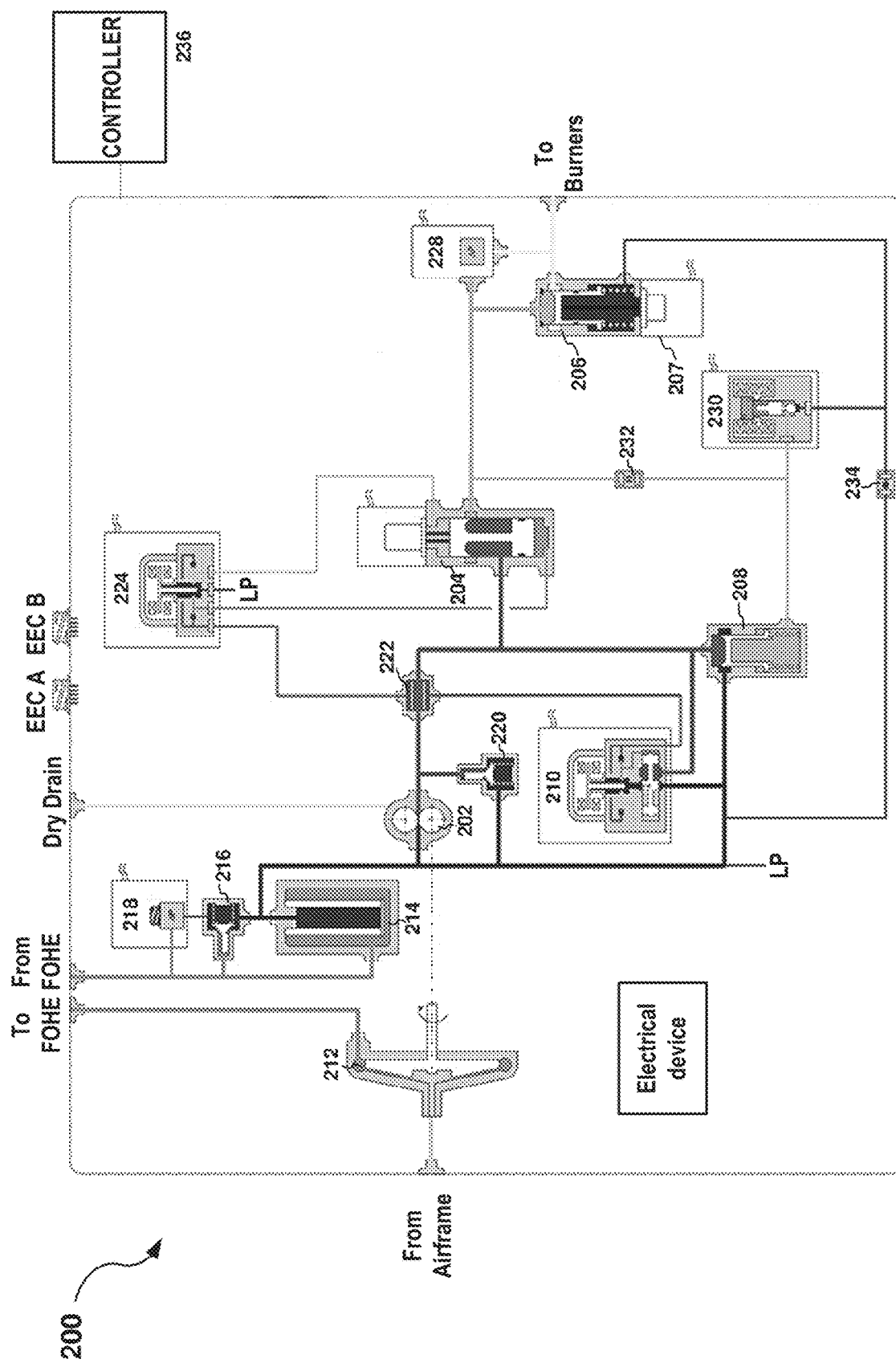
FIG. 2 illustrates a schematic of an example of a fuel pump and metering unit (FPMU)

FIG. 2 illustrates an example of a fuel pump and metering unit (FPMU) 200. The FPMU may be included in the gas turbine engine 100 of FIG. 1 and may control a flow of fuel to, for example, the combustion section 130. The FPMU 200 may control the flow of fuel from, for example, fuel tanks to combustors and/or burners The FPMU 200 may include a pump 202, a metering valve 204, a pressure valve 206, a spill valve 208, and a secondary spill valve 210. The FPMU may also include a second pump 212, a fuel filter 214, a filter bypass valve 216, a filter transducer 218, a pressure relief valve 220, a flow filter 222, a metering servo valve 224, a pressure transducer 228, an inductive probe 207, a shutoff valve 230, a pull-down orifice 232, a back-pressure orifice 234, and a controller 236.

The FPMU 200 may be in communication with the aircraft frame, or airframe, a fuel oil heat exchanger (FOHE), a controller, an electronic engine controls, a dry drain, and/or the combustion section 130, for example, burners of the combustion section 130.

The pump 202 may be any pump capable of pumping a fluid through the FPMU 200. The pump 202, for example, may be a positive displacement pump such as a rotary or reciprocating pump. The pump 202 may be, for example a gear pump. The pump 202 may be in fluid communication with a fluid source, for example, a fuel source. The pump 202 may be in fluid communication with the FOHE. The pump 202 may be downstream of the FOHE, the filter transducer 218, the filter bypass valve 216, and/or the fuel filter 214. Downstream or upstream refers to the direction of flow of the fluid, such as fuel, traveling through the FPMU during operation of the FPMU, for example, in the direction of flow as the fluid flows from the FOHE to the burners. Additionally or alternatively, the pump 202 may be downstream of the pressure relief valve 220, the spill valve 208, the secondary spill valve 210, the pressure valve 206, the shutoff valve 230, and/or the back pressure orifice 234. The pump 202 may be upstream and/or in fluid communication with the metering valve 204, the flow filter 222, the pressure relief valve 220, the spill valve 208, and/or the secondary spill valve 210.

The metering valve 204 may be any device capable of controlling and/or altering the flow of fluid through the FPMU 200. The metering valve 204 may be, for example, a cylinder and piston style valve, but could be any type of valve capable of regulating fluid flow. The metering valve 204 may include, be connected to, and/or be in communication with a linear variable differential transformer (LVDT) or other component capable of controlling, detecting, and/or communicating a position of the metering valve 204, for example, how open or closed the metering valve is and/or how much flow the metering valve 204 is allowing to flow through to downstream of the metering valve 204.

The metering valve 204 may be in fluid communication with and/or downstream of the pump 202 and/or the flow filter 222. The metering valve 204 may be in fluid communication with and upstream of the pressure valve 206, the shutoff valve 230, the pull down orifice 232, and/or the spill valve 208. Additionally or alternatively, the metering valve 204 may be in communication with the metering servo valve 224. The metering servo valve 224 may control and/or otherwise communicate with the metering valve 204. The metering servo valve 224 may, for example, be in communication with the controller 236. The metering servo valve 224 may be any component capable of communicating with the controller 236 and metering valve 204, and controlling the metering valve 204.

The metering valve 204 may be downstream of the pump 202 and/or the flow filter 222. The metering valve 204 may be upstream of the pressure transducer 228, the pressure valve 206 fitted with dual channel inductive probe 207, the pull-down orifice 232, the shutoff valve 230, and/or the spill valve 208.

The pressure valve 206 may be any device capable of raising or controlling a pressure of the flow of fluid flowing to the combustion section 130 and/or burners. The pressure valve 206 may, for example, be any device capable of ensuring that fluid is delivered to the burners at or above a minimum pressure. The minimum pressure may be, for example, a pre-determined or set value. The pressure valve 206 may, for example, be a spring-loaded valve, where the spring exerts a pressure on the valve, closing off an orifice of the valve in fluid communication with the burners until the incoming fluid flow has a pressure great enough to compress the spring. The pressure valve 206 may be, for example, a pressure raising and shutoff valve (PRSV). The pressure valve 206 may include an inductive probe 207, for example, to communicate the status of the pressure valve 206 to the controller 236. Feedback from the inductive probe 207 may also be used to calculate fuel flow to combustor.

The pressure valve 206 may be in fluid communication with and/or downstream of the metering valve 204, and/or the pressure transducer 228. The pressure valve may be in fluid communication with and/or upstream of the pressure transducer 228, the combustion section 130, the burners, the shutoff valve 230, and/or the pump 202.

The spill valve 208 may be any device capable of spilling, rerouting, and/or absorbing a flow of excess fluid. For example, the spill valve 208 may reroute excess fluid flowing from the pump 202 towards the metering valve. The spill valve 208 may be, for example, a spring-loaded valve. The spill valve 208 may be a pressure drop spill valve (PDSV). When a flow of fluid from the pump 202 exceeds a pressure needed to overcome the spring, the spring may compress, opening the spill valve 208 and allowing a portion of the flow from the pump 202 to be diverted through the spill valve 208 instead of flowing to the metering valve 204.

The spill valve 208 may be in fluid communication with and/or downstream of the pump 202, and/or the flow filter 222. The spill valve 208 may be in communication with and/or upstream of the pump 202.

The secondary spill valve 210 may be any device capable of spilling, rerouting, and/or absorbing a flow of excess fluid. For example, the secondary spill valve 210 may reroute excess fluid flowing from the pump 202 towards the metering valve. The secondary spill valve 210 may be, for example, an electronically operated valve, such as a servo valve. The controller 236 may send a signal to the secondary spill valve 210 to open or close the valve 210. For example, when the controller 236 determines an excess of fluid, for example, fuel, is being pumped by the pump 202 to the burners, the controller 236 may open the secondary spill valve 210 to prevent excess fuel from reaching the burners to mitigate an uncontrolled or uncommanded high thrust situation. An electrical signal sent to the secondary spill valve 210 may be proportional to the degree of opening of the valve 210 and/or how much fluid is being spilled.

The secondary spill valve 210 may be in fluid communication with and/or downstream of the pump 202, and/or the flow filter 222. The secondary spill valve 210 may be in communication the pump 202.

The pressure transducer 228 may be any device capable of detecting and/or measuring the pressure difference across an inlet and an outlet of the pressure valve 206. The pressure transducer 228 may be downstream of the metering valve 204 and upstream of the burners. The pressure sensor 228 may be parallel with the pressure valve 206.

The shutoff valve 230 may be any device capable of closing or shutting off a flow of fluid, for example fuel. The shutoff valve 230 may be, for example, a solenoid valve. For example, in a situation where the engine needs to immediately be shut off, for example in a run-away scenario, the shutoff valve 230 may be engaged, for example, the solenoid energized, to stop a flow of fuel through the FPMU 200 and to prevent stress on the other components of the FPMU 200.

The second pump 212 may be any device capable of increasing the pressure of the fluid to provide enough positive pressure to an inlet of the pump 202 to prevent, for example, cavitation. The second pump 212 may increase or boost the fluid, for example fuel, as it flows through the FPMU 200 from, for example, an aircraft or fuel tanks upstream of the FPMU 200. The second pump 212, may be, for example, a boost pump. The second pump 212 may increase the pressure of the fluid, for example, to approximately 20-25 psi.

The fuel filter 214 may be any device capable of filtering out contaminates from the fluid flowing through the FPMU 200. For example, the filter 214 may filter out contaminated from an upstream fuel tank before the fluid flows to the pump 202 and other downstream components. The filter bypass valve 216 may be any device capable of opening and allowing a flow of fluid through a bypass conduit, for example, if the fuel filter becomes clogged and prevents a flow of fluid to the rest of the FPMU 200. The filter transducer 218 may be any device capable of altering, for example, the controller 236 when the filter 214 becomes clogged.

The pressure relief valve 220 may be any device capable of opening by a pressure of the fluid reaching a certain point. For example, if a blockage or obstruction occurs downstream in the FPMU 200 if obstruction, and a pressure downstream of the pump 202 is raised past a certain point, the valve 220 may open and allow a flow of the fluid back to an inlet of the pump 202. The valve 220 may prevent over pressurization. The valve 220 may be set such that it will never open during normal operations of the FPMU 200, but will open and allow flow back to an inlet of the pump 202 if the pressure raises higher than a pressure expected during normal operation.

The flow filter 222 may be any device capable of filtering out contaminates and debris. For example, the flow filter 222 may filter out debris from the pump 202 before the fluid flows downstream the valves, such as the secondary spill valve 210 and/or the metering servo valve 224. The flow filter 222 may be, for example, a wash flow filter, where the main flow path may flow through a mesh cylinder with holes and the filtered flow is taken through the holes at right angles.

The pull down orifice 232 may be any device capable of dampening or regulating abrupt changes of flow through the FPMU 200. For example, the pull down orifice may be as simple an orifice with a smaller diameter than the conduit in which it is disposed, or a device similar to a dashpot. The pull down orifice 232 may provide dynamic regulation function during shut off of the engine 100 or FPMU 200.

The back pressure orifice 234 any device capable of dampening or regulating abrupt changes of flow through the FPMU 200. For example, the back pressure orifice may be as simple an orifice with a smaller diameter than the conduit in which it is disposed, or a device similar to a dashpot. The back pressure orifice 234 may provide damping to the FPMU 200 as the pressure valve 206 opens or closes. The back pressure orifice 234 may force the flow of fluid to squeeze through a smaller orifice to dampen or slows down the flow.

During operation of the turbine engine 100, the FPMU 200 may regulate the flow of fluid such as fuel through from the airframe, for example, from fuel tanks, to the combustion section 130 and/or the burners in the combustion section 130. The fluid may flow into the FPMU 200 and through the second pump 212. The second pump 212 may raise the pressure and/or flow rate of the fluid flow as the fluid exits the second pump 212. The fluid may flow out of the FPMU 200 to a fuel oil heat exchange and then re-enter the FPMU 200.

The fluid may flow through the fuel filter 214 and/or the filter bypass valve 216. The fluid may flow through the pump 202. The pump 202 may increase the pressure of the fluid flow as the fluid flows through the pump 202. The fluid may flow through the filter 222.

Under normal operating conditions, the fluid may flow from the pump 202 to the metering valve 204. The metering valve 204 may open or close to a set degree based on a demand flow of the fluid. The demand flow may be based on a current or commanded operating condition of the turbine engine 100. For example, based on a commanded thrust output of the turbine engine 100 such as an input or instruction given by a pilot of the aircraft to the engine 100, a corresponding demand flow of the fuel may be, for example, generated by the controller 236. For example, to generate the demand flow based on a commanded thrust output, the controller 236 may look up the corresponding demand flow in a reference table or stored memory. The demand flow may refer to, for example, the amount of fluid flow delivered to the combustion section 130 and/or burners from the FPMU to enable the combustion section 130 and/or turbine engine 100 to produce an amount of thrust corresponding to the received thrust command.

The metering valve 204 may have a specific degree of opening that corresponds to the demand flow. For example, based on the inlet and outlet dimensions of the metering valve 204 and the expected pressure of the fluid flow through the FPMU 200, for example, based on the speed of the pumps 212 and 202, a degree of opening of the metering valve 204 may be determined to allow fluid to flow through the metering valve 204 and supply the combustion section 130 and burners with the demand flow of the fluid. The controller 236 may send an instruction to the metering servo valve 224 and the servo valve 224 may open or close the metering valve 204 accordingly.

The fluid may flow through the metering valve 204 to the pressure valve 206. The pressure valve 206 may, for example, raise the pressure of the fluid as it flows through the pressure valve so that the fluid flowing to the burners is at or above a minimum pressure. The minimum pressure may vary based on application.

During operation of the engine 100 and the FPMU 200, the spill valve 208 may open and close based on a pressure of the system, for example, the pressure of the fluid flowing through the inlets of the spill valve 208. For example, when a pressure downstream of the pump 202 and upstream of the metering valve 204 rises high enough to overcome the pressure exerted by the spring of the spill valve 208, the spill valve 208 may open and spill or absorb an excess flow of the fluid, diverting the excess, spilled flow away from the metering valve 204 back to an inlet of the pump 202.

During operation, the pressure sensor 228 may monitor the pressure upstream and downstream of the pressure valve 206. For example, the pressure sensor 228, or pressure transducer, may measure the pressure of the fluid flow flowing into the pressure valve 206 from the metering valve 204 and also measure the pressure of the fluid flow flowing out of the pressure valve 206 to the combustion section 130 and/or burners. The pressure sensor 228 and/or the controller 236 may use the two pressure readings at the inlet and the outlet of the pressure valve 206 along with the feedback from dual channel inductive probe 207 to determine the rate of flow of fluid flowing through the pressure valve 206 and flowing to the burners. The actual flow rate may be determined based on these pressure readings and the feedback from dual channel inductive probe 207.

The determined flow rate may be compared against the demand flow rate. For example, the determined flow rate is larger than the demand flow rate, this may potentially lead to an excess of fluid or fuel being sent to the burners and cause an uncommanded or uncontrolled thrust situation where the actual thrust being produced by the turbine engine is larger than the thrust command input by, for example, the pilots of the aircraft or a system controlling the engine 100.

The controller 236 may compare the determined flow rate with the demand flow rate. When the determined flow rate exceeds the demand flow rate, the controller 236 may open the secondary spill valve 210 to spill or absorb the excess flow and prevent or mitigate an uncommanded or uncontrolled thrust situation.

Figure 3:
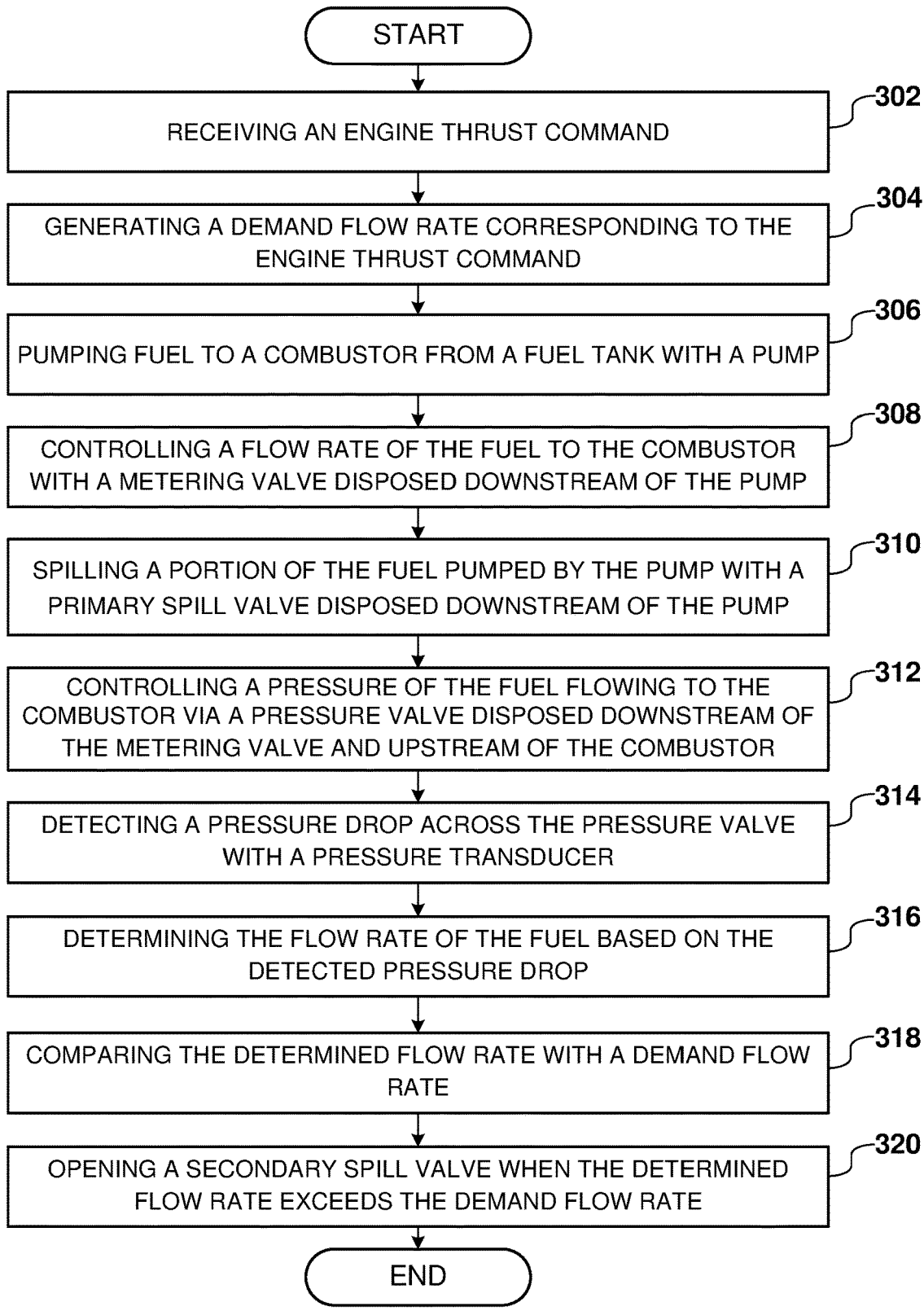
FIG. 3 illustrates an example method for mitigating and/or detecting an uncommanded or uncontrollable high thrust situation.

FIG. 3 illustrates a flow diagram of an example of steps to detect or mitigate an uncontrolled or uncommanded thrust situation. The method may comprise the controller 236 and/or the FPMU 200 receiving an engine thrust command (302). Based on the engine thrust command received, the controller 236 may cause a demand flow rate corresponding to the received engine thrust command to be generated in the FPMU 200 (304). For example, as explained above, the controller 236 may control or cause the metering valve 204 to be opened to a degree that corresponds to the demand flow rate. For example, the controller 236 may open the metering valve 204 to a degree such that the fluid or fuel flowing through the FPMU, for example, through the pressure valve 206 and to the combustion section 130 and/or burners, is flowing at the demand flow rate.

During operation, the pump 202 may pump the fluid or fuel to the combustion section 130 (306). The metering valve 204 may control a flow rate of the fluid or fuel flowing to the combustion section 130 (308). A portion of the fluid or fuel flowing through the FPMU 200, for example, an excess amount of fluid or fuel, may be spilled (310) by the spill valve 208. The pressure valve 206 may control and/or raise (312) the pressure of the fluid or fuel before the fluid flows to the combustion section 130. The pressure sensor 228 may sense, detect, and/or measure the pressure at the inlet and outlet of the pressure valve 206 and/or the pressure differential across the pressure valve 206 (314).

The controller 236 may, based on the detected pressure differential across the pressure valve 206 and the feedback from dual channel inductive probe 207 which shows the known dimension of the inlet and/or outlet of the pressure valve 206, calculate and/or determine the actual flow rate of the fluid flowing to the combustion section 130 (316). The controller 236 may compare the determined flow rate with the demand flow rate (318). If the determined flow rate is higher than the demand flow rate, the controller 236 may open the secondary spill valve 210 to spill or absorb the excess fluid (320) and prevent an excess of fluid flowing to the combustion section 130.

The steps may include additional, different, or fewer operations than illustrated in FIG. 3. The steps may be executed in a different order than illustrated in FIG. 3.

Each component may include additional, different, or fewer components. For example the valves may include additional controlling components such as servo valves. The controller 236 may comprise a memory and/or a processor. The FPMU 200 and/or turbine engine 100 may be implemented with additional, different, or fewer components. For example, the FPMU 200 may include additional or different pumps, valves, sensors, and/or probes. Additionally or alternatively, the FPMU 200 may, for example, not include certain components such as the pull down orifice 232, the back pressure orifice 234, one or more of the filters 214, 222, or other components of the FPMU 200.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of mitigating uncommanded or uncontrollable high thrust in a gas turbine engine, the method comprising: spilling a portion of fuel with a primary spill valve disposed downstream a pump; detecting a pressure differential across a pressure valve with a pressure transducer, the pressure valve controlling a pressure of the fuel; determining a flow rate of the fuel based on the detected pressure differential and the positional feedback of pressure valve opening; and opening a secondary spill valve in response to the determined flow rate exceeding a demand flow rate.

A second aspect relates to the method of aspect 1 wherein the determined flow rate exceeds the demand flow rate due to a failure of at least one of the pump or metering valve.

A third aspect relates to the method of any preceding aspect further comprising generating, with an engine controller, the demand flow rate from a thrust command.

A fourth aspect relates to the method of any preceding aspect further comprising controlling a flow rate of the fuel with a metering valve, the metering valve opened or closed with an engine controller based on the demand flow rate.

A fifth aspect relates to the method of any preceding aspect further comprising opening or closing the secondary spill valve via an engine controller an engine controller based on the determined flow rate.

A sixth aspect relates to the method of any preceding aspect further comprising pumping fuel to a combustor from a fuel tank with a pump, wherein the pump is a positive displacement pump.

A seventh aspect relates to the method of any preceding aspect wherein the primary spill valve is a spring pressure spill valve.

An eighth aspect relates to the method of any preceding aspect wherein the secondary spill valve is a servo valve.

A ninth aspect relates to the method of any preceding aspect further comprising spilling excess fuel via the secondary spill valve to prevent uncommanded or uncontrolled thrust.

A tenth aspect relates to the method of any preceding aspect wherein the spilled fuel is directed towards an intake of the pump.

An eleventh aspect relates to a system for mitigating uncommanded or uncontrollable high thrust in a gas turbine engine, the system comprising: a fuel tank; a combustor in fluid communication with the fuel tank; a pump disposed downstream of the fuel tank and upstream of the combustor; a metering valve disposed downstream of the pump and upstream of the combustor; a pressure valve disposed downstream of the metering valve and upstream of the combustor; a pressure transducer configured to monitor the pressure differential across the pressure valve; and a spill valve disposed downstream of the pump configured to spill additional flow when a flow rate determined based on the monitored pressure differential exceeds a demand flow rate.

A twelfth aspect relates to the system of aspect 11, wherein the spill valve is a secondary spill valve, the system further comprising a primary spill valve disposed downstream of the pump.

A thirteenth aspect relates to the system of any preceding aspect further comprising an engine controller configured to generate the demand flow rate from a thrust command.

A fourteenth aspect relates to the system of any preceding aspect further comprising an engine controller configured to control open and close of the metering valve based on the demand flow rate.

A fifteenth aspect relates to the system of any preceding aspect further comprising an engine controller configured to control open and close of the spill valve based on the determined flow rate.

A sixteenth aspect relates to the system of any preceding aspect wherein the pump is a positive displacement pump.

A seventeenth aspect relates to the system of any preceding aspect wherein the primary spill valve is a spring pressure spill valve.

An eighteenth aspect relates to the system of any preceding aspect wherein the spill valve is a servo valve.

A nineteenth aspect relates to the system of any preceding aspect wherein the system is disposed within a fuel pressure metering unit of an aircraft.

A twentieth aspect relates to a method of mitigating uncommanded or uncontrollable high thrust in a turbine engine, the method comprising: receiving an engine thrust command; generating a demand flow rate corresponding to the engine thrust command; controlling, with a metering valve, a flow of fuel sent to a combustor via the metering valve; controlling a pressure of the fuel sent to the combustor via a pressure valve disposed downstream of the metering valve and upstream of the combustor; detecting a pressure differential across the pressure valve with a pressure sensor; determining a flow rate of the fuel based on the detected pressure differential across the pressure valve; comparing the determined flow rate with the demand flow rate and a feedback of the pressure valve opening using an inductive probe; and opening a spill valve when the determined flow rate exceeds the demand flow rate.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of mitigating uncommanded or uncontrollable high thrust in a gas turbine engine, the method comprising:
    spilling a portion of fuel with a primary spill valve disposed downstream of a pump;
    detecting a pressure differential across a pressure valve with a pressure transducer, the pressure valve controlling a pressure of the fuel;
    determining a flow rate of the fuel based on the detected pressure differential and a positional feedback of a pressure valve opening; and
    opening a secondary spill valve in response to the determined flow rate exceeding a demand flow rate.

2. The method of claim 1 wherein the determined flow rate exceeds the demand flow rate due to a failure of at least one of the pump or a metering valve.

3. The method of claim 1 further comprising generating, with an engine controller, the demand flow rate from a thrust command.

4. The method of claim 1 further comprising controlling a flow rate of the fuel with a metering valve, the metering valve opened or closed with an engine controller based on the demand flow rate.

5. The method of claim 1 further comprising opening or closing the secondary spill valve via an engine controller based on the determined flow rate.

6. The method of claim 1 further comprising pumping fuel to a combustor from a fuel tank with the pump, wherein the pump is a positive displacement pump.

7. The method of claim 1 wherein the primary spill valve is a spring pressure spill valve.

8. The method of claim 1 wherein the secondary spill valve is a servo valve.

9. The method of claim 1 further comprising spilling excess fuel via the secondary spill valve to prevent uncommanded or uncontrolled thrust.

10. The method of claim 1 wherein the spilled fuel is directed towards an intake of the pump.

11. A system for mitigating uncommanded or uncontrollable high thrust in a gas turbine engine, the system comprising:
a fuel tank;
a combustor in fluid communication with the fuel tank;
a pump disposed downstream of the fuel tank and upstream of the combustor;
a primary spill valve disposed downstream of the pump;
a metering valve disposed downstream of the pump and upstream of the combustor;
a pressure valve disposed downstream of the metering valve and upstream of the combustor;
a pressure transducer configured to monitor a pressure differential across the pressure valve; and
a secondary spill valve disposed downstream of the pump configured to spill additional flow when a flow rate determined based on the monitored pressure differential and a positional feedback of a pressure valve opening exceeds a demand flow rate.

12. The system of claim 11 further comprising an engine controller configured to generate the demand flow rate from a thrust command.

13. The system of claim 11 further comprising an engine controller configured to control open and close of the metering valve based on the demand flow rate.

14. The system of claim 11 further comprising an engine controller configured to control open and close of the secondary spill valve based on the determined flow rate.

15. The system of claim 11 wherein the pump is a positive displacement pump.

16. The system of claim 11, wherein the primary spill valve is a spring pressure spill valve.

17. The system of claim 11, wherein the secondary spill valve is a servo valve.

18. The system of claim 11 wherein the system is disposed within a fuel pressure metering unit of an aircraft.

19. A method of mitigating uncommanded or uncontrollable high thrust in a turbine engine, the method comprising:
receiving an engine thrust command;
generating a demand flow rate corresponding to the engine thrust command;
controlling, with a metering valve, a flow of fuel sent to a combustor via the metering valve;
controlling a pressure of the fuel sent to the combustor via a pressure valve disposed downstream of the metering valve and upstream of the combustor;
spilling a portion of the fuel with a primary spill valve;
detecting a pressure differential across the pressure valve with a pressure sensor;
determining a flow rate of the fuel based on the detected pressure differential across the pressure valve and a positional feedback of a pressure valve opening;
comparing the determined flow rate with the demand flow rate; and
opening a secondary spill valve when the determined flow rate exceeds the demand flow rate.

* * * * *